United States Patent [19]

Lee

[11] Patent Number: 4,976,824
[45] Date of Patent: Dec. 11, 1990

[54] WATER DISTILLATION AND AERATION APPARATUS

[76] Inventor: Naisin Lee, 862 Garland Dr., Palo Alto, Calif. 94303

[21] Appl. No.: 456,080

[22] Filed: Dec. 22, 1989

Related U.S. Application Data

[63] Continuation of Ser. No. 207,572, Jun. 16, 1988, abandoned.

[51] Int. Cl.$^5$ ............................ B01D 3/02; C03F 1/04
[52] U.S. Cl. ..................................... 202/172; 202/176; 202/180; 202/185.1; 202/186; 203/10; 203/49; 203/DIG. 17
[58] Field of Search ............ 202/234, 172, 176, 185.1, 202/185.5, 187, 186, 202, 233, 235, 188, 203; 203/49, 25, 71, 10, DIG. 17; 159/28.6, 16.1

[56] References Cited

U.S. PATENT DOCUMENTS

| | | | |
|---|---|---|---|
| 2,368,665 | 2/1945 | Kohman et al. | 203/49 |
| 2,372,846 | 4/1945 | Nettel et al. | 203/49 |
| 2,902,414 | 9/1959 | Schmerzler | 202/46 |
| 3,212,999 | 10/1965 | Sommers | 202/172 |
| 3,214,348 | 10/1965 | Lichenstein | 203/49 |
| 3,214,351 | 10/1965 | Lichtenstein | 202/185 |
| 3,240,683 | 3/1966 | Rodgers | 202/173 |
| 3,317,406 | 5/1967 | Beard | 202/180 |
| 3,334,026 | 8/1967 | Dobell | 203/10 |
| 3,350,279 | 10/1967 | Tolchin | 202/83 |
| 3,356,591 | 12/1967 | Peterson | 203/10 |
| 3,385,768 | 5/1968 | Yost | 202/186 |
| 3,385,770 | 5/1968 | Roe | 202/236 |
| 3,522,149 | 7/1970 | Arvan | 202/196 |
| 3,522,151 | 7/1970 | Dismore | 202/236 |
| 3,687,817 | 8/1972 | Jimerson | 202/181 |
| 3,694,321 | 9/1972 | Marovich | 202/83 |
| 3,779,871 | 12/1973 | Brown | 203/88 |
| 3,843,463 | 10/1974 | Brown | 203/49 |
| 3,859,173 | 1/1975 | Barckhausen | 202/173 |
| 3,860,492 | 1/1975 | Lowi | 202/236 |
| 3,925,167 | 12/1975 | Rodgers | 202/174 |
| 3,935,077 | 1/1976 | Dennison | 202/83 |
| 4,089,750 | 5/1978 | Kirschman | 202/480 |
| 4,135,984 | 1/1979 | Kirschman | 202/83 |
| 4,140,586 | 2/1979 | Kwasnuski | 203/47 |
| 4,210,494 | 7/1980 | Rhodes | 203/49 |
| 4,233,153 | 11/1980 | Hammel | 203/10 |
| 4,235,679 | 11/1980 | Swaidan | 202/234 |
| 4,261,796 | 4/1981 | Lemoine | 202/176 |

(List continued on next page.)

FOREIGN PATENT DOCUMENTS 816867 8/1937 France .
780272 7/1957 United Kingdom .................. 203/49

Primary Examiner—Wilbur Bascomb
Attorney, Agent, or Firm—Townsend and Townsend

[57] ABSTRACT

An apparatus for fluid distillation in general, and in particular, or water, adapted for consumer or home use, but capable of being made and operated so that it is suitable for separating solvents and solutes and other industrial use. The apparatus includes a housing having divider structure to form one or more compartments for receiving water to be distilled. The divider structure also presents a fluid passage for receiving water vapor which is formed when the upper portion of the water in the housing is boiled by a heater. An aerator is provided in the housing below the heater and in a location within the water compartment. The aerator operates to direct air under a slight pressure into the water so that air bubbles can be generated in the water. The air bubbles will rise and break the surface of the water as the upper part of the water is being boiled by the heater. This causes a vapor pressure to be generated in the space above the water level and water vapor is then caused to move through the fluid passage downwardly to a lower chamber in which the water vapor is collected as a condensate. As the water vapor moves downwardly in the fluid passage, it moves in heat exchange relationship to the water in the compartment of the housing. Several embodiments of the housing of the present invention are disclosed.

10 Claims, 8 Drawing Sheets

U.S. PATENT DOCUMENTS

| | | | |
|---|---|---|---|
| 4,265,712 | 5/1981 | McLean | 202/166 |
| 4,269,663 | 5/1981 | McFee | 202/185.3 |
| 4,269,664 | 5/1981 | Younger | 202/185.4 |
| 4,276,124 | 6/1981 | Mock | 202/236 |
| 4,304,638 | 12/1981 | Smith | 202/202 |
| 4,325,781 | 4/1982 | Proske | 159/13.2 |
| 4,329,206 | 5/1982 | Cartland | 202/177 |
| 4,339,307 | 7/1982 | Ellis | 202/176 |
| 4,342,624 | 8/1982 | Chute | 202/176 |
| 4,342,625 | 8/1982 | Dennison | 202/181 |
| 4,350,568 | 9/1982 | Dalupan | 202/180 |
| 4,350,570 | 9/1982 | Maisotsenko | 203/10 |
| 4,390,396 | 6/1983 | Koblenzer | 202/166 |
| 4,396,463 | 8/1983 | Josis | 203/10 |
| 4,402,793 | 9/1983 | Petrek | 202/174 |
| 4,404,062 | 9/1983 | Whitehurst | 202/185 B |
| 4,406,748 | 9/1983 | Hoffman | 202/233 |
| 4,415,075 | 11/1983 | McNesky | 202/177 |
| 4,421,605 | 12/1983 | Huhta-Kolvisto | 202/181 |
| 4,421,606 | 12/1983 | Tsumura | 203/10 |
| 4,476,024 | 10/1984 | Cheng | 210/500.2 |
| 4,478,685 | 10/1984 | Mortenson | 202/158 |
| 4,482,431 | 11/1984 | Voorhees | 202/176 |
| 4,549,936 | 10/1985 | Erickson | 202/167 |
| 4,585,522 | 4/1986 | Beck | 202/181 |
| 4,585,524 | 4/1986 | Hoiss | 203/11 |
| 4,595,459 | 6/1986 | Kusakawa | 202/177 |
| 4,595,460 | 6/1986 | Hurt | 203/21 |
| 4,612,090 | 9/1986 | Ellis | 202/176 |
| 4,622,102 | 11/1986 | Diebel | 202/185.3 |
| 4,626,321 | 12/1986 | Grethlein | 203/26 |
| 4,664,751 | 5/1987 | Lloyd | 202/176 |
| 4,696,718 | 9/1987 | Lasater | 202/176 |
| 4,724,048 | 2/1988 | Helmick | 202/176 |
| 4,734,167 | 3/1988 | Goeldner | 202/176 |
| 4,743,343 | 5/1988 | Sakai | 203/49 |

4,976,824

WATER DISTILLATION AND AERATION APPARATUS

This is a continuation of application Ser. No. 207,572, filed June 16, 1988, now abandoned.

BACKGROUND OF THE INVENTION

1. Field of the Invention

This invention relates to the field of chemical engineering and to solute-solvent separation and more particularly, to apparatus and method suitable for consumer and industrial use in distilling of water.

2. Description of the Prior Art

Techniques for the separation of a solute from a relatively non-volatile solvent are well known and have been used for a number of years. However, such techniques are often complex in operation, inexpensive and consume large amounts of energy. Thus, the application of these techniques, on a large scale, is limited. For example, the purification of water from a saline source or brackish supply or from tap water, requires a considerable amount of structure. Various approaches for water purification from sources of the type described include multi-stage flash evaporation making use of reduced pressure for evaporation; reverse osmosis using hydrostatic pressures; vacuum freezing; distillation (mostly batch type) based on the boiling of water; moisture recovery based on large amounts of air-water contact; and electrodialysis based upon ion exchanges.

The problems which the foregoing approaches encounter are significant, such as the fabrication of special membranes, and the use of special alloys for protecting machinery against corrosion or scaling. Many of these techniques also require high energy consumption for mechanical or evaporation purposes. Similar considerations are often involved in the purification concentration and separation techniques for solution of relatively non-volatile solvents or solutes.

It is especially desirable to have available at a point of use, purified water both for drinking and other purposes. Firstly, the health benefits are well known; secondly, a centralized purified water supply could not maintain its high quality if it is delivered through conventional plumbing structures; thirdly, while there are water purification devices which are commercially available, they are not modestly priced, and they require frequent maintenance or replacement of key components while consuming large amounts of energy during operation.

Because of the numerous problems associated with conventional structures mentioned above, it is advantageous for household and public use to be able to conveniently and economically purify water from water supplies at the point of use of the water. The present invention relates in particular to improvements in distillation apparatus and methods which will satisfy the need for such a water source.

SUMMARY OF THE INVENTION

The present invention is directed to an apparatus and method of improved design for solvent-solute separation, particularly the distillation of water. The invention is especially adapted for consumer or home use but it is capable of being made and operated so that it is suitable for other point-of-use applications, such as offices and industrial use, as well.

The apparatus of the present invention includes a housing having divider structure to form one or more compartments for receiving water to be distilled. The divider structure also presents a fluid passage for receiving water vapor which is formed when the upper portion of the water in the housing is evaporated with a heater which heats and maintains the water near its boiling temperature.

An aerator is provided in the housing below the heater and in a location within the water compartment. The aerator operates to direct air under a slight pressure into the water so that air bubbles can be generated in the water. The air bubbles will rise and break the surface of the water as the upper part of the water is being boiled by the heater. This causes a vapor pressure to be generated in the space above the water level and water vapor is then caused to move through the fluid passage downwardly to a lower chamber in which the water vapor is collected as a condensate. As the water vapor moves downwardly in the fluid passage, it moves in heat exchange relationship to the water in the compartment of the housing; thus, the water in the compartment is preheated while effectively reducing the temperature of the water vapor to cause it to condense to form a distillate or condensate collectible in the lower chamber from which the distillate in the form of distilled water can be removed.

Several embodiments of the housing of the present invention are disclosed herein. In one embodiment, the housing is comprised of a plurality of extended, vertical plates which are coupled together to form a plurality of compartments and a plurality of fluid passages with recesses being provided to accommodate the aerator in the lower part of the housing and to accommodate the heater in the upper part of the housing. A control can be provided to assure that the water level is always above the heater. Thus, the system can work on a continuous or intermittent basis to supply distilled or potable water in the lower chamber.

In a second embodiment of the housing, the water compartments are formed from cylindrical members which are concentric with each other and which are above a lower chamber for receiving the distillate. In a third embodiment, a single cylindrical wall surrounds a plurality of open top tubes, with the region outside of the tubes being the water compartment and the tubes being the fluid passages for water vapor. In all embodiments of the housing, the aerator and heater are provided such that the aerator will generate air bubbles in the water which rise to the water surface as the water near the surface is boiled by the heater to form water vapor under a slight pressure which causes flow of the water vapor into and through the passage or passages for eventual condensation as it approaches the lower chamber of the apparatus.

The primary object of the present invention is to provide an improved apparatus and method for distillation of water, wherein such apparatus and method is suitable for home and other point-of-use applications so as to provide potable water for human consumption.

Another object of the present invention is to provide an apparatus and method of the type described wherein the apparatus is of minimal size and operates to distill a relatively large volume of water in a relatively short time and with a minimum of expenditure of energy.

Another object of the present invention is to provide an apparatus and method of the type described in which the apparatus includes a combined heat exchanger with solute-solvent separation capability designed to operate in a manner to reduce energy requirements.

Still another object of the present invention is to provide an apparatus and method for enhanced heat exchange with no moving parts involved in the solute or solvent passing to the heat exchanger wherein the apparatus operates by injection of gaseous bubbles which rise through the solution between extended vertical plate to avoid the need for moving parts in the apparatus itself.

Other objects of this invention will become apparent as the following specification progresses, reference being had to the accompanying drawings for an illustration of the invention.

Although the specific embodiments described herein relate to water distillation, it will be appreciated that the invention relates to the separation of any solute from a solvent or vice versa. It could be such that the concentrate is of interest rather than the distillate. In this regard, for example, the apparatus and method of the present invention may be used to concentrate juice or syrup or to separate alcohol from water, or to concentrate some mineral dissolved for recycle or waste treatment. In many cases, the aerator of the apparatus of the present invention may operate on a suitable gas, such as nitrogen or argon, which is inert to the solute or solvent of interest.

DETAILED DESCRIPTION OF THE PREFERRED EMBODIMENTS

Figure 2:
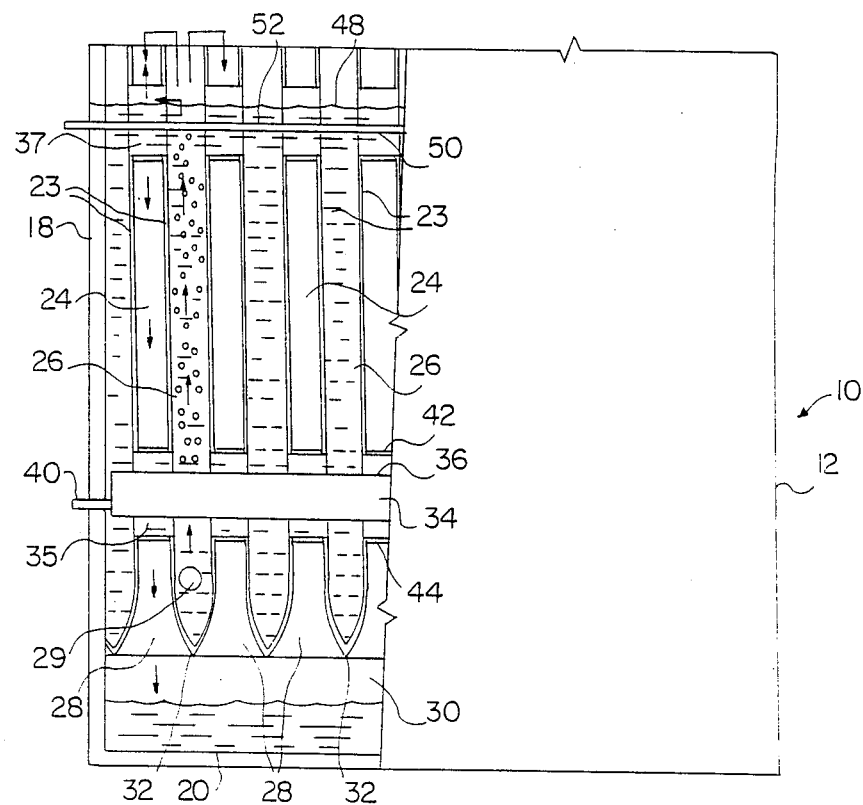
FIG. 2 is a vertical section through the apparatus of FIG. 1, showing the plates which form parts of the apparatus.

A first embodiment of the distillation apparatus of the present invention is broadly denoted by the numeral 10 and includes a housing 12 provided with a pair of opposed sides 14 and 16, a pair of ends 18 (only one of which is shown in FIG. 2) and a bottom 20. The housing also has a top 22 coupled with the sides and ends and covering the top of the housing.

The interior of housing 12 is provided with a plurality of vertical, substantially extended plates 23 which are spaced apart in a manner to divide the interior of the housing into a set of water compartments 26 and a set of fluid passages 24. Passages 24 have open bottoms 28 (FIG. 2) which communicate with a lower chamber 30 which is adapted to receive and contain distilled water formed from the condensate derived from a distillation process. The two plates 23 defining each second compartment 26 have converging lower ends which are interconnected at location 32 (FIG. 2) to assure that the compartment 26 is out of fluid communication with lower chamber 30 yet the water compartments 26 all are in fluid communication with each other.

Figure 1:
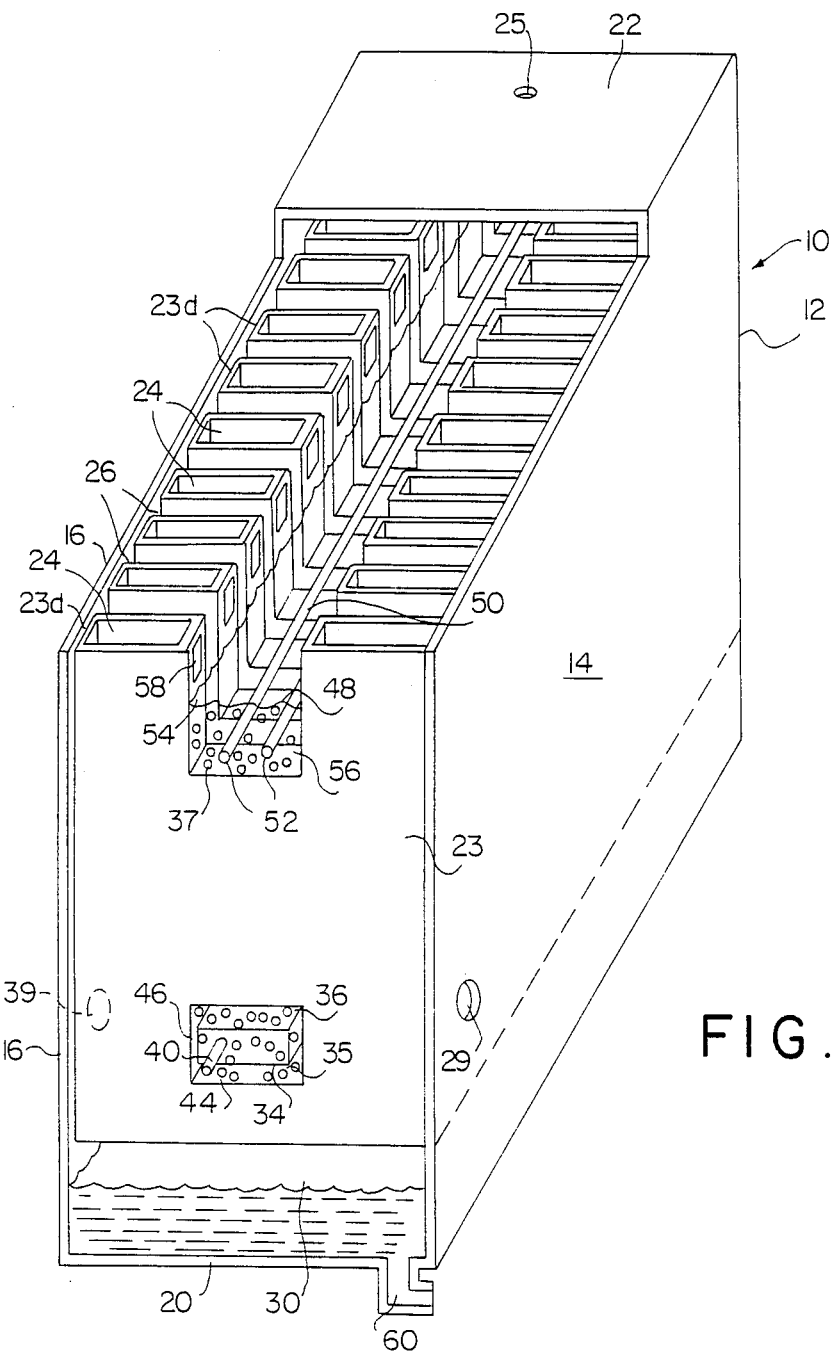
FIG. 1 is a fragmentary perspective view of a first embodiment distillation apparatus of the present invention, parts being broken away to illustrate details of construction.

An aerator 34 extends through a lower recess 35 in the plates 23 in the lower portions thereof as shown in FIG. 1 and 2. Aerator 34 is a hollow, box-like structure which has a perforate surface 36 (FIG. 1). A tube 40 is provided to couple the aerator 34 with a source of air pressure such as the outlet of a blower or compressor 41.

Each fluid passage 24 is isolated from compartments 26 and from the regions around aerator 34 by proper sealing at top 42, at bottom 44 and at sides 46 (FIG. 1). However, compartments 26 are in fluid communication with the region adjacent to aerator 34. Thus, when water is in housing 12 up to a level 48 (FIG. 2), the water will reside in compartments 26 and in the recess 35 surrounding aerator 34; thus, the compartments 26 are all in fluid communication with each other and out of fluid communication with fluid passages 24. Since each compartment 24 is between a pair of adjacent compartments 26, the fluid in passages 24 is in heat exchange relationship with the water in adjacent compartments 26.

A water heater 50 is mounted in housing 12 near the upper end thereof. Heater 50 can be of any suitable type, such as an electrical heater, a solar heater, a gas heater or the like. For purposes of illustration, heater 50 is shown in FIGS. 1 and 2 as being comprised of a pair of tubes 52 which are parallel to each other and extend in a recess 37 in the plates in the housing (FIG. 1). The recess 37 is similar to the recess 35, or can be identical to recess 35, is in fluid communication with compartments 26 but is out of fluid communication with each fluid passage 24 by virtue of a pair of side panels 54 and a bottom panel 56 which are coupled together and to respective, adjacent plates 23. Each side panel 54 has an upper opening 58 therethrough which places the upper part of recess 37 in fluid communication with the corresponding fluid passage 24. Openings 58 are also above water level 48. Top 22 covers the housing 12 and is above the upper ends of fluid passages 24 and compartments 26 to allow the passages of water vapor to fluid passage 24. One or more vent holes 25 are also provided on cover 22 for venting some volatile substances.

In operation, water to be distilled is directed into housing 12 in some suitable manner, such as through an opening 29 in one side of wall 14 (FIG. 1) The water is directed into the housing up to a level 46 above heater 50. When the proper water level has been reached, aerator 34 is energized to cause air to issue from the aerator and to rise in the water through compartments 26 as shown in FIG. 2. The heater will have been energized as well to cause boiling of the water near the upper water level 48 and to cause vapor to be formed above the water level 48.

The vapor will be under a certain pressure in the space above water level 48 by virtue of the continuous rise in air bubbles from aerator 34. This vapor pressure is sufficient to cause the vapor to be forced into openings 58 and the upper ends of passages 24 (FIG. 1) and then into and downwardly through fluid passages 24 where the vapor condenses as condensate which gravitates into lower chamber 30 through the bottom openings 28. A drain tube 60 is provided for drawing off the condensate from lower chamber 30.

Water can be added as needed to housing 12 by use of a tube (not shown) under the control of a level sensor 5 which operates a valve which directs water into opening 29 and into housing 12. In this way, the upper level 48 of the water can be kept at a particular height in the housing so that the heater will always be submerged in the water and will continuously create vapor above the water level. An opening 39 is further introduced into housing 12 for exiting the water from water compartment for cleaning purposes.

Figure 3:
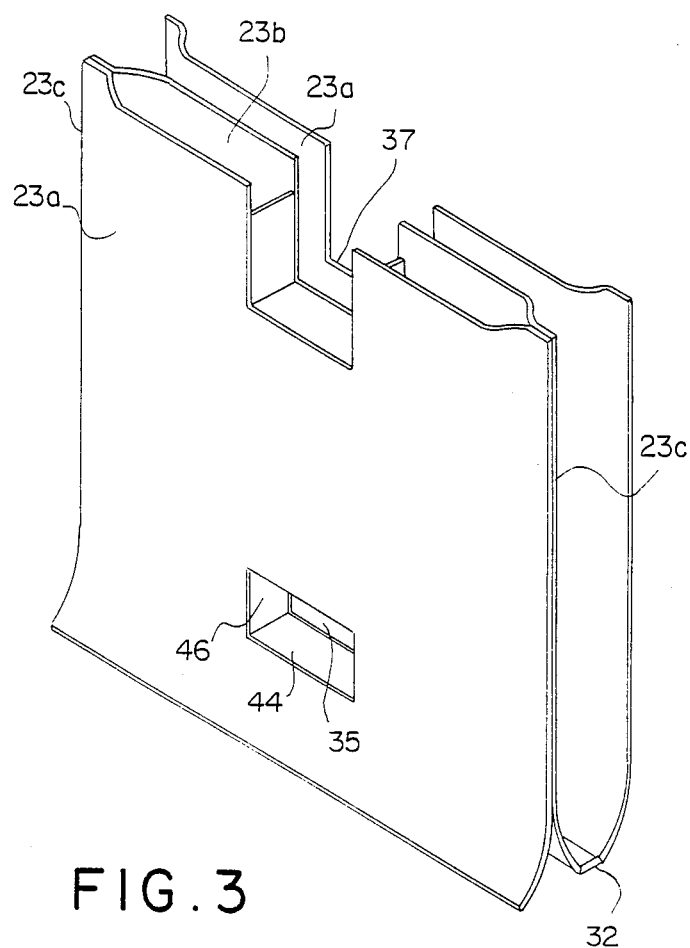
FIG. 3 is a perspective view of a number of adjacent plates of the apparatus of FIGS. 1 and 2.

FIG. 3 shows a second embodiment of the plate structure for housing 12. As shown in FIG. 3, plates 23a and 23b are joined together along adjacent outer, vertical edges 23c. This is to be compared with the embodiment of the plates shown in FIGS. 1 and 2 in which the plates are parallel completely throughout and are joined at their outer ends by outer walls of 23d (FIG. 1). The plate structure shown in FIG. 3 also includes the lower recess 35 for receiving the aerator and the upper recess 37 for receiving the heater.

Figure 4:
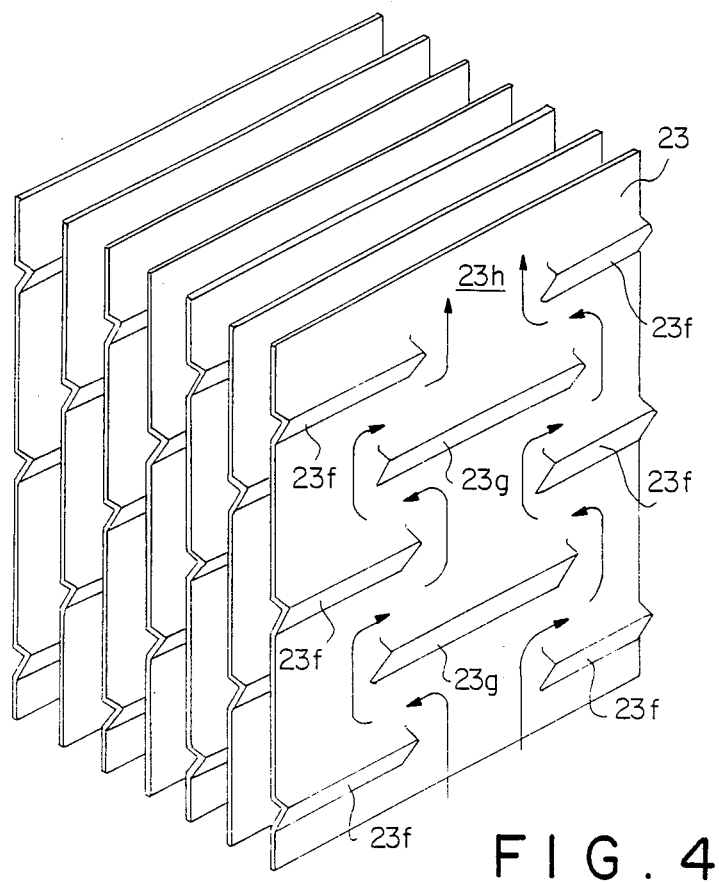
FIG. 4 is a perspective view of an alternate form of the plates for the apparatus of FIGS. 1 and 2.

FIG. 4 shows still another embodiment of the plate structure of the present invention, the plates 23 each having projections 23f and 23g projecting from one face 23h thereof to form serpentine paths as shown by the arrows for the flow of air bubbles upwardly in compartments 26 and for the flow of water vapor downwardly through the passages 24. The plates can be made of metal, plastics or glass. The thickness of one plate can be typically 0.002 inches to 0.050 inches.

Projections 23f and 23g on the plates increase the path lengths of the flow of the air bubbles and the water vapor so as to have greater heat exchange to assure that the latent heat of condensation of vapor is utilized for evaporation of the water, and thus minimize the energy required. The projections 23f and 23g may take various shapes. The height of the projections 23f or 23g, also defining the width of the fluid passage, such as 24, or the water compartment, such as 26, can be from typically 1/16 inch to ¾ inch.

Figure 5:
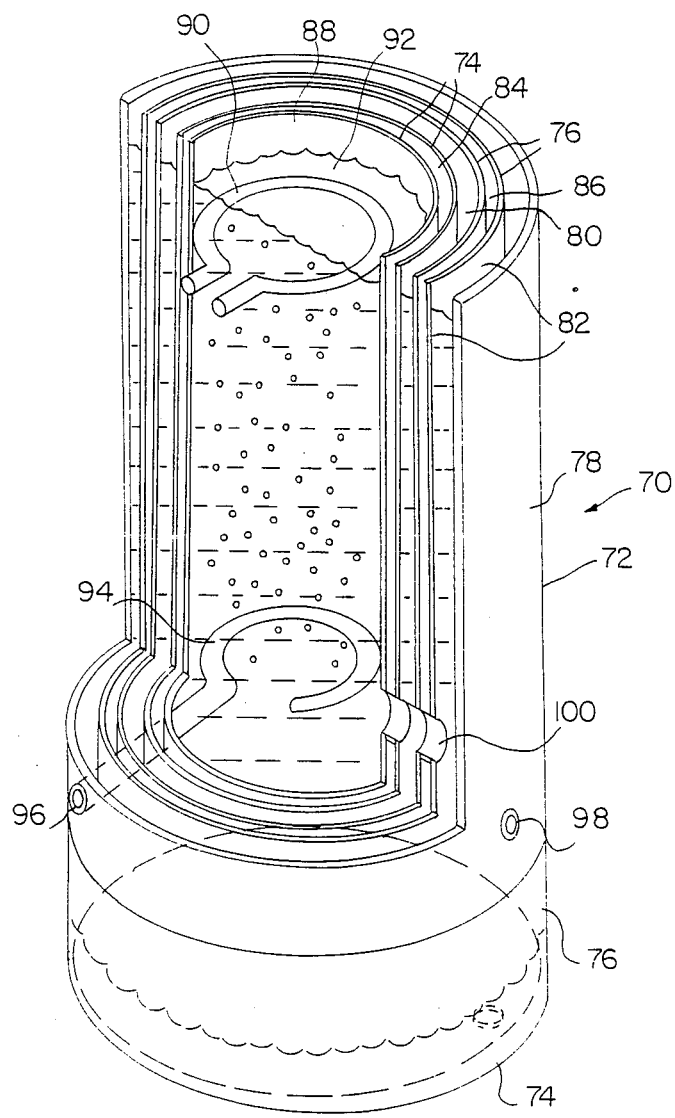
FIG. 5 is a perspective view, partly broken away and in section, of a second embodiment of the apparatus of the present invention.

FIG. 5 shows another embodiment of the apparatus of the present invention, the apparatus being denoted by the numeral 70 and including a cylindrical housing 72 having a bottom 74 above which is a lower chamber 76 for receiving a distillate which is in the form of a condensate formed by the condensation of water vapor derived from water distilled in the housing. To this end, housing 72 includes a first pair of concentric cylindrical wall members 74 and 76 which are spaced apart from each other and from the outer wall 78 of the housing to form a pair of cylindrical water compartments 80 and 82, respectively. These compartments are adapted to be filled with water to a certain level and the inner compartment 80 surrounds a cylindrical fluid passage 84 which is bounded thereof by the cylindrical wall members 74. Inner wall 74 surrounds a central open space 88 which communicates with water compartments 80 and 82 through passage 100 so that the level of the water in central space 88 is at level 92, the same level of the water in compartments 80 and 82. The upper part of opening 88 above level 92 is in fluid communication with fluid passage 84.

A ring-shaped heater 90 is mounted in some suitable manner in housing 72 near the upper level 92 of the water in central space 88. The heater is below the water level 92 and is adapted to be energized so that the water adjacent to the heater is boiled to form water vapor in the space 88 above the water level.

A ring-shaped aerator 94 is in the housing below heater 90 near the lower end of space. A suitable fluid pressure device, such as a blower, coupled to the entrance end 96 of aerator 94, forces air into and through the perforations in the surface of the aerator 94. Thus, air bubbles are caused to rise in the water to be distilled in space 88 when the aerator is actuated.

Figure 5A:
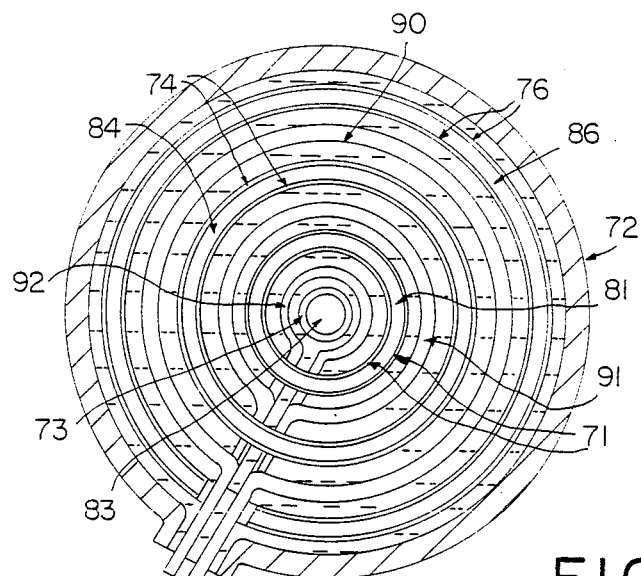
FIGS. 5A and 5B are cross-sectional and perspective views, respectively, of another embodiment of the apparatus.
Figure 5B:
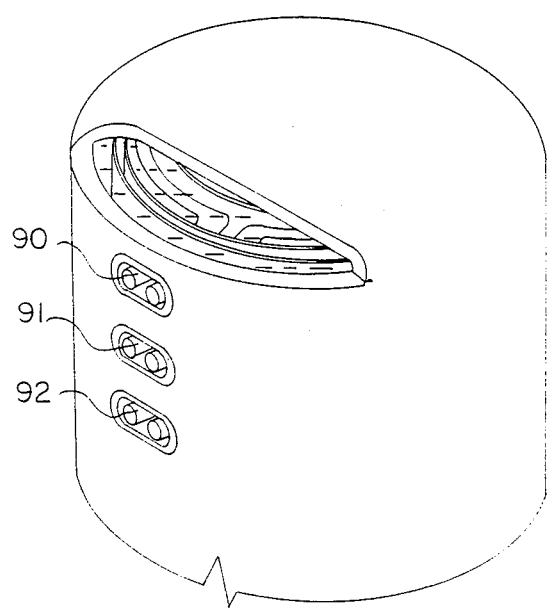

It is appreciated that multiple ring-shaped heaters and aerators can be arranged in water compartments, such as 82 and 80. And more than two water compartments can be adopted. FIGS. 5A and 5B show such arrangements of multiple compartments where heaters 90, 91 and 92 and fluid passages 86, 84 and 83 are shown. The vertical plate structure as shown in FIG. 4 can also be readily applied to the cylindrical walls.

In operation, the aerator is actuated to cause air bubbles to flow upwardly as shown in FIG. 5. Heater 90 is also energized to heat and boil the upper portions of the water below the water level 92. As the bubbles rise and as the water boils, vapor pressure is established above water level 92 in space 88. The water vapor will flow because of the vapor pressure into and through fluid passage 84 toward the lower chamber 76 in which the water vapor is collected. As the water vapor flows downwardly through passage 84 and 86, it moves in heat exchange relationship to the water in space 88 and in compartments 80 and 82, so that the water vapor is cooled and thereby condensed at a higher rate while the heat from the water vapor is conducted through cylindrical walls 74 and 76 to thereby preheat the water and provide for energy savings as a result.

Water is continuously directed into the housing 72 through a pipe coupled with a water passage 98 (FIG. 5). To this end, a level sensor (not shown) can be provided to sense the upper level 92 at all times to assure that it does not drop below the upper surface of heater 90.

Figure 6:
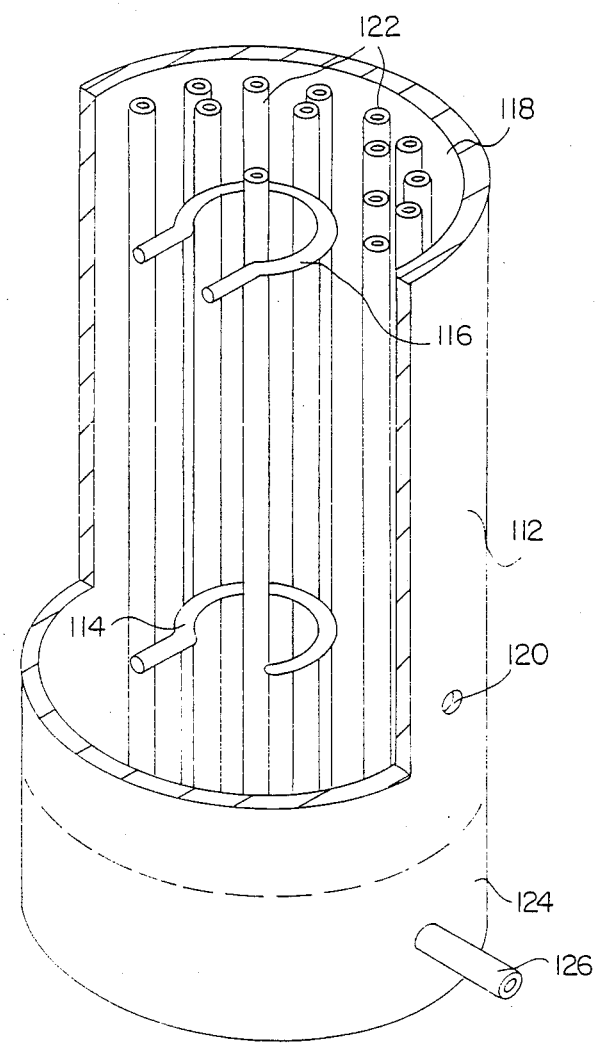
FIG. 6 is a view similar to FIG. 5 but showing a third embodiment of the apparatus of the present invention.
Figure 6B:
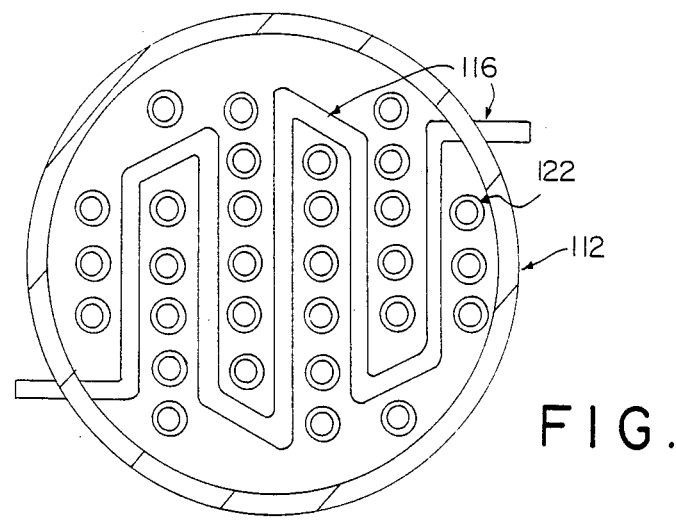
FIGS. 6A and 6B are top plan and perspective views, respectively, of still another embodiment of the apparatus.
Figure 6A:
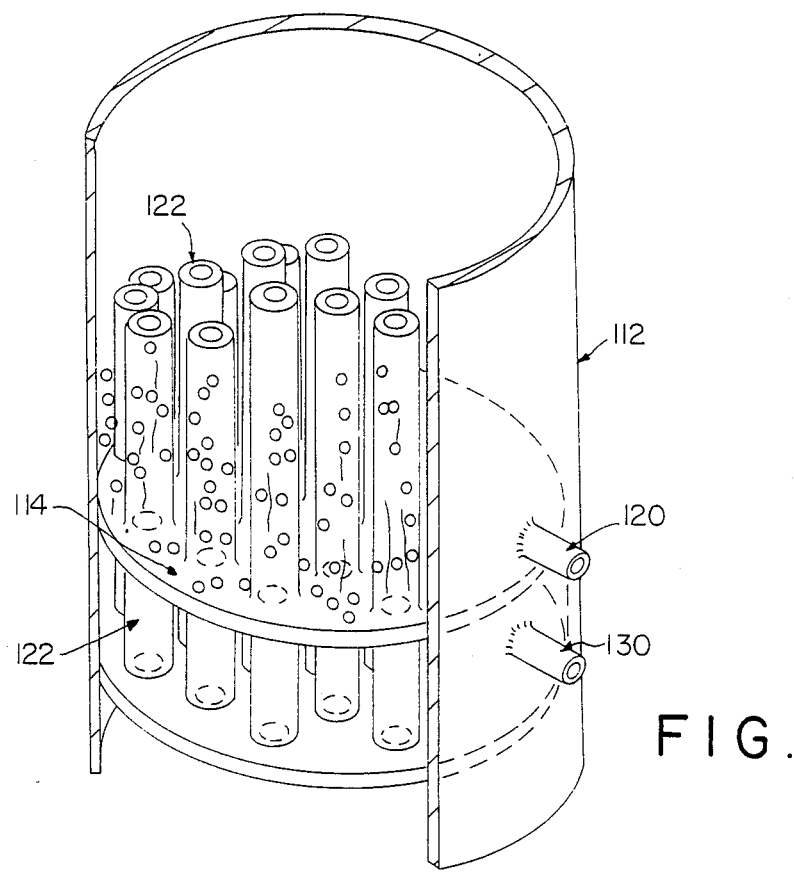

Another embodiment of the apparatus of the present invention is shown in FIG. 6 and is similar in construction to the embodiment of FIG. 5 in that a cylindrical housing 112 has a ring-shaped aerator 114 and a ring-shaped heater 116 therein at vertically spaced locations within the interior region 118 of the housing. FIG. 6B shows another design of the heater 116 at the upper part of the housing 112. And FIG. 6A shows a flat aerator 114 at the lower part of the housing 112. Air bubbles arise from the aerator 114 and surround fluid passage tubes 122 all over. A suitable fluid pressure device can be coupled to an entrance port 130 for the generation of bubbles.

Water is allowed to be directed into the housing 112 through a hole 120. Water vapor generated by the boiling of water above heater 116 flows into and through open top tubes 122 which define fluid passages communicating at their lower ends with a lower chamber 124 at the bottom of housing 112. Tubes 122 can be intertwined or serpentine shape as to extend the length for further heat exchange (not shown).

In operation, when aerator 114 is energized, air bubbles are caused to rise in space 118 and the air bubbles move past heater 116 while the heater boils the water adjacent thereto. The flow of air bubbles in the space 118 above the water level causes a vapor pressure to be created which induces a flow of water vapor into the open tops of tubes 122 and then downwardly through the tubes while the water surrounding the tubes is in heat exchange relationship to the fluid flow thereto. This causes the water vapor to condense to form a distillate which gravitates into lower chamber 124 from which the distillate can be periodically taken, such as through a passage or a tube 126.

What is claimed:

1. Water distillation apparatus comprising:
   a housing having wall means forming a compartment for containing water in a quiescent condition with the water having an upper surface at a predetermined level, the compartment having a lower end and an upper end, said compartment having an upper space near the upper end of the compartment and above the water level, the upper surface of the water being the interface between the water and said upper space when the water is contained in the compartment;
   means near the lower end of the compartment for presenting a lower fluid receiving chamber;
   means defining a fluid passage extending between and in fluid communication with said upper space and the lower chamber;
   means in the compartment adjacent to and below the upper level of the water and in a position to directly contact the water in the compartment near said interface for substantially boiling the water to form water vapor at a vapor pressure sufficient to cause the water vapor to pass through said interface and into said upper space; and
   means in the compartment adjacent to the lower end thereof for aerating the water to cause air bubbles to form and to rise in the water as the water is boiled, said wall means having surface structure positional and configured to channel the air bubbles substantially directly to the boiling means and to substantially maintain the water in the compartment in a substantially quiescent condition as the air bubbles rise in the water and the boiling means boils the water.

2. Apparatus as set forth in claim 1, wherein the forming means includes a plurality of generally vertical plates dividing the housing into a plurality of water-receiving compartments and a plurality of fluid passages.

3. Apparatus as set forth in claim 2, wherein is included a fluid passage between each pair of adjacent compartments, respectively.

4. Apparatus as set forth in claim 2, wherein is included a first recess formed in the plates, said boiling means extending through the first recess, there being a second recess in the plates below the first recess, said aerating means being in the second recess.

5. Apparatus as set forth in claim 2, wherein the plates are vertically extended and have a pair of opposed sides, one side of each plate having a number of projections thereon to form a serpentine fluid path for fluid flowing past the sides of the plates.

6. Apparatus as set forth in claim 5, wherein the projections are horizontally staggered between the upper and lower edges of the plates.

7. Apparatus as set forth in claim 2, wherein the housing is provided with a pair of opposed sides and a pair of opposed ends, the plates being generally parallel to the ends and generally perpendicular to the sides.

8. Apparatus as set forth in claim 1, wherein the fluid passage is in heat exchange relationship to the compartment.

9. Apparatus as set forth in claim 1, wherein said housing has passage means for admitting water to said compartment to keep the water at said water level.

10. Apparatus as set forth in claim 1, wherein the aerating means is coupled with an air pressure source externally of the housing.

* * * * *